United States Patent
Shrivastava et al.

(10) Patent No.: US 7,366,960 B2
(45) Date of Patent: Apr. 29, 2008

(54) USE OF INCARNATION NUMBER FOR RESOURCE STATE CYCLING

(75) Inventors: Sunita Shrivastava, Redmond, WA (US); Chittur P. Subbaraman, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 10/962,011

(22) Filed: Oct. 8, 2004

(65) Prior Publication Data

US 2006/0085695 A1    Apr. 20, 2006

(51) Int. Cl.
*G06F 11/00*    (2006.01)
(52) U.S. Cl. .......................................... 714/48; 714/57
(58) Field of Classification Search ............ None
See application file for complete search history.

(56) References Cited

U.S. PATENT DOCUMENTS

| | | | | |
|---|---|---|---|---|
| 5,528,759 A * | 6/1996 | Moore | ........................ | 709/224 |
| 6,237,034 B1 * | 5/2001 | Fulford | ....................... | 709/224 |
| 6,654,902 B1 * | 11/2003 | Brunelle et al. | .............. | 714/4 |
| 2002/0007468 A1 * | 1/2002 | Kampe et al. | ................ | 714/4 |
| 2002/0049845 A1 * | 4/2002 | Sreenivasan et al. | ....... | 709/226 |
| 2002/0120597 A1 * | 8/2002 | Bae | .............................. | 707/1 |
| 2002/0129305 A1 * | 9/2002 | Ahrens et al. | ............... | 714/57 |
| 2004/0267901 A1 * | 12/2004 | Gomez | ....................... | 709/217 |
| 2005/0243816 A1 * | 11/2005 | Wrenn et al. | ............... | 370/389 |

* cited by examiner

*Primary Examiner*—Gabriel Chu
(74) *Attorney, Agent, or Firm*—Workman Nydegger

(57) ABSTRACT

In a server cluster, a system and method is provided for mitigating redundant resource failure notifications and other problems resulting from late handling of messages. Traditional resource management can result in the generation of redundant resource failure notifications that trigger unnecessary recovery actions, or cause other cluster problems such as performing an action that has previously been handled as part of failure recovery. The present invention tracks resource failures and eliminates recovery actions for redundant resource failure notifications. An incarnation number is passed to a resource each time it is called, and is incremented whenever a resource failure notification is delivered. Failure notifications having an incarnation number lower than the current incarnation number are discarded. Message processing similarly uses an incarnation number to distinguish between queued messages that correspond to those from a currently healthy node and those from a previous incarnation of the node, which no longer have meaning.

19 Claims, 7 Drawing Sheets

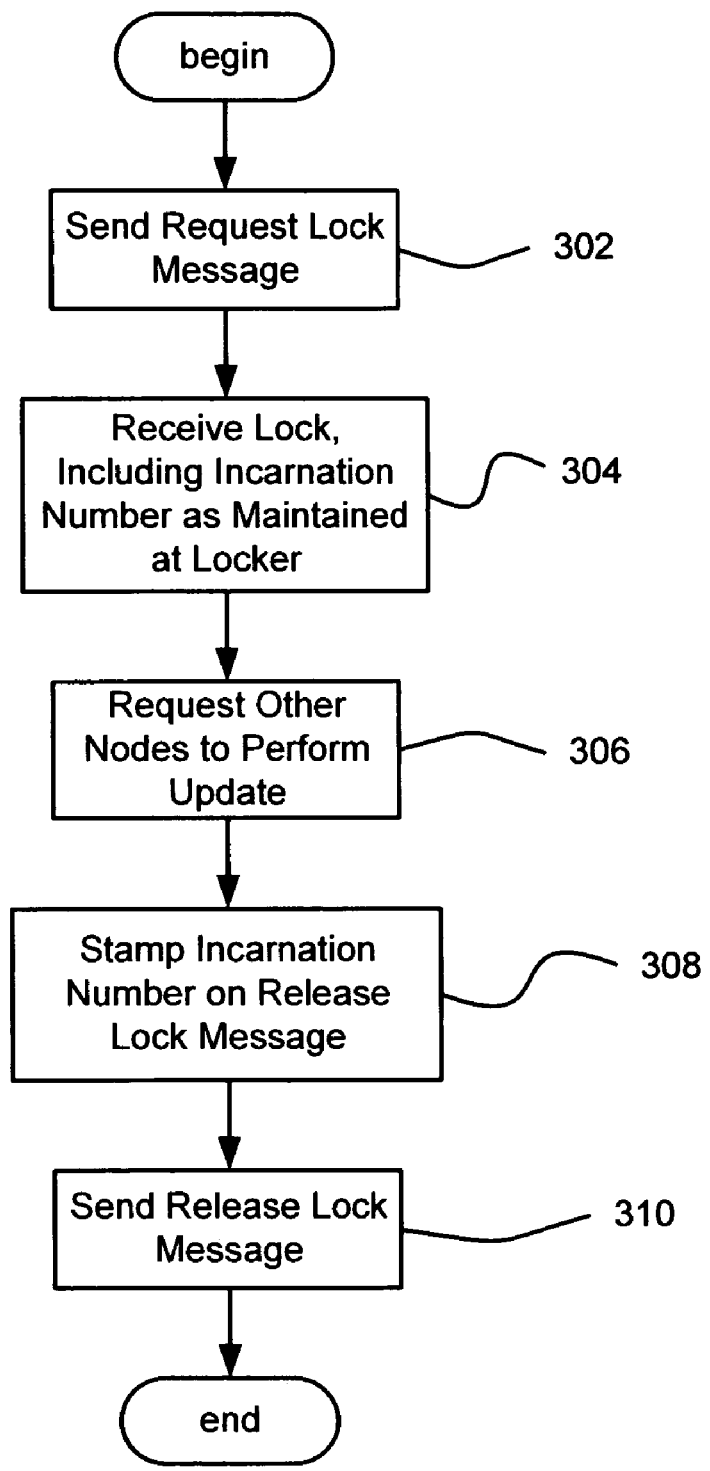

USE OF INCARNATION NUMBER FOR RESOURCE STATE CYCLING

FIELD OF THE INVENTION

The invention relates generally to clustered computing nodes, and more particularly to handling failures of applications in one node of a cluster.

BACKGROUND

A cluster is a set of interconnected computer system servers arranged as nodes that provide access to resources such as application programs. One reason to have a server cluster is that multiple linked computer systems significantly improve computing availability. For example, if one node fails, its resources may failover to other surviving nodes, where in general, failover means that the other nodes provide services that correspond to those that were previously provided by the now-failed node.

Existing communications protocols used in clusters, (such as the global update protocol, or GLUP) allow all healthy nodes to process a set of messages in a predictable order (such as FIFO) despite node or communication failures. In general, GLUP can be utilized to replicate data to the nodes of a cluster; a more detailed discussion of the GLUP protocol is described in the publication entitled "Tandem Systems Review" Volume 1, Number 2, June, 1985 pp. 74-84. Problems arise, however, when failures occur and trigger recovery actions and the like before the messages are processed. For example, consider an example in which a node sends a message to a locker node to request a lock, receives the lock in response to the request, multicasts the request to other nodes, receives proper responses and then sends a message releasing the lock. Then, in this example, this node fails. In certain situations, the locker node can detect the failure before processing the message that released the lock. Because the locker node can only assume that the lock had not been released by the failed node, and cannot allow the failed node to hold it indefinitely, the locker node frees the lock, assuming the node is dead. If the locker node again gives out the lock, (which may be to the same node after having been restarted), and then later processes the release message (which may unpredictably appear), the lock is improperly released, potentially causing significant problems in the cluster.

Similar problems arise with resources running on nodes, where duplicate failure notifications can occur. Resources may be failed and restarted before the second failure notification is processed, resulting in another restart even though the resource was working properly; the delay in processing the second failure message causes the problem. What is needed is a way for cluster software to distinguish between delayed messages that no longer have meaning (i.e., they are stale) and relevant /current messages that need to be acted upon.

SUMMARY OF THE INVENTION

Briefly, the present invention is directed towards a system and method by which the failure of cluster components such as nodes and resources does not cause later problems that result from delayed message processing. For example, one such cluster component that may fail is a node, while another cluster component that may fail is a resource arranged in a resource dependency tree. To track the relevancy of a node's messages, incarnation numbers that correspond to various lives of the nodes are use throughout the cluster. Similarly, incarnation numbers that correspond to resource failures are used within a node on which the resource is running.

In one implementation, nodes perform global updates by requesting a lock from a locker in charge of a global lock that ensures that only one global update is in progress at any given time. When any preceding updates are complete, the locker node gives permission to a sender node to broadcast its update to the other nodes in the cluster, as well as performing the update itself. To this end, the locker node, which maintains an incarnation number for the sender node, sends a message giving the sender node the lock along with the incarnation number that it has. The sender node sends the updates, one at a time, to the other nodes, instructing them (as well as instructing itself) to do the update. The sender node then releases the lock by sending a message to the locker node, after stamping the incarnation number into the release message.

The sender node may then die, such as by crashing or because of a failure in its communication link to another node, or for some other reason. When this occurs the locker node receives a failure notification, and if the release message has not been processed, frees the lock as part of a clean-up operation, because the cluster cannot allow a lock to be held indefinitely by a failed node.

When the release message is processed, the locker node knows whether it is relevant or out of date based on the incarnation number. For example, when the locker node received the failure notification for this node, the locker node incremented its incarnation number maintained for that node. As a result, any message received from that node after the failure notification is stamped with an incarnation number that is less than the incarnation number currently maintained for the node, and is thus known to be out of date and can be discarded. Thus, if the release message was processed before the failure notification was received, the lock is released properly, as it would be when a failure does not occur. Conversely, if the release message was dequeued after the failure notification was received, the message is discarded, as the lock was released (or will be released shortly) due to failure cleanup actions and should not be released twice, which might cause problems. In this manner, relevant messages of existing nodes may be distinguished from out of date messages of nodes that have failed, regardless of whether those nodes have come back online in a new incarnation prior to the message being processed.

A similar concept applies to other cluster entities, including resources. Cluster resources include cluster components such as application programs, their components, required hardware, IP addresses and so forth. A dependency between resources defines the order in which the resources are brought online or offline. The use of an incarnation number eliminates duplicate failure messages that occur with respect to the dependent resources failing in a tree.

For example, consider an application program that is dependent on a disk resource, that is, when the resource tree is brought online, the disk resource is brought online first, and, after it has come online, the application program resource (which needs the disk resource) is brought online. If the disk resource fails, then a failure notification message results. However, since the disk resource failed, it is very likely that the application program resource also fails, because the application program resource needs disk access. The failover manager may see the disk failure before the application program resource's failure, whereby the failover manager will restart the resource group in the appropriate order. The use of an incarnation number with the failure messages allows the failover manager to safely discard the application program resource's later queued failure message, whenever it gets dequeued, because it is lower than the incarnation number presently known for the resources, thereby avoiding another recovery action, which would be unnecessary.

Other advantages will become apparent from the following detailed description when taken in conjunction with the drawings, in which:

BRIEF DESCRIPTION OF THE DRAWINGS

FIG. 3 is a flow diagram generally representing actions taken at a sender in response to a request to a lock a message and FIG. 4 is a flow diagram generally representing the handling of a node failure notification message, in accordance with various aspects of the present invention;

DETAILED DESCRIPTION

Exemplary Operating Environment

Figure 1:
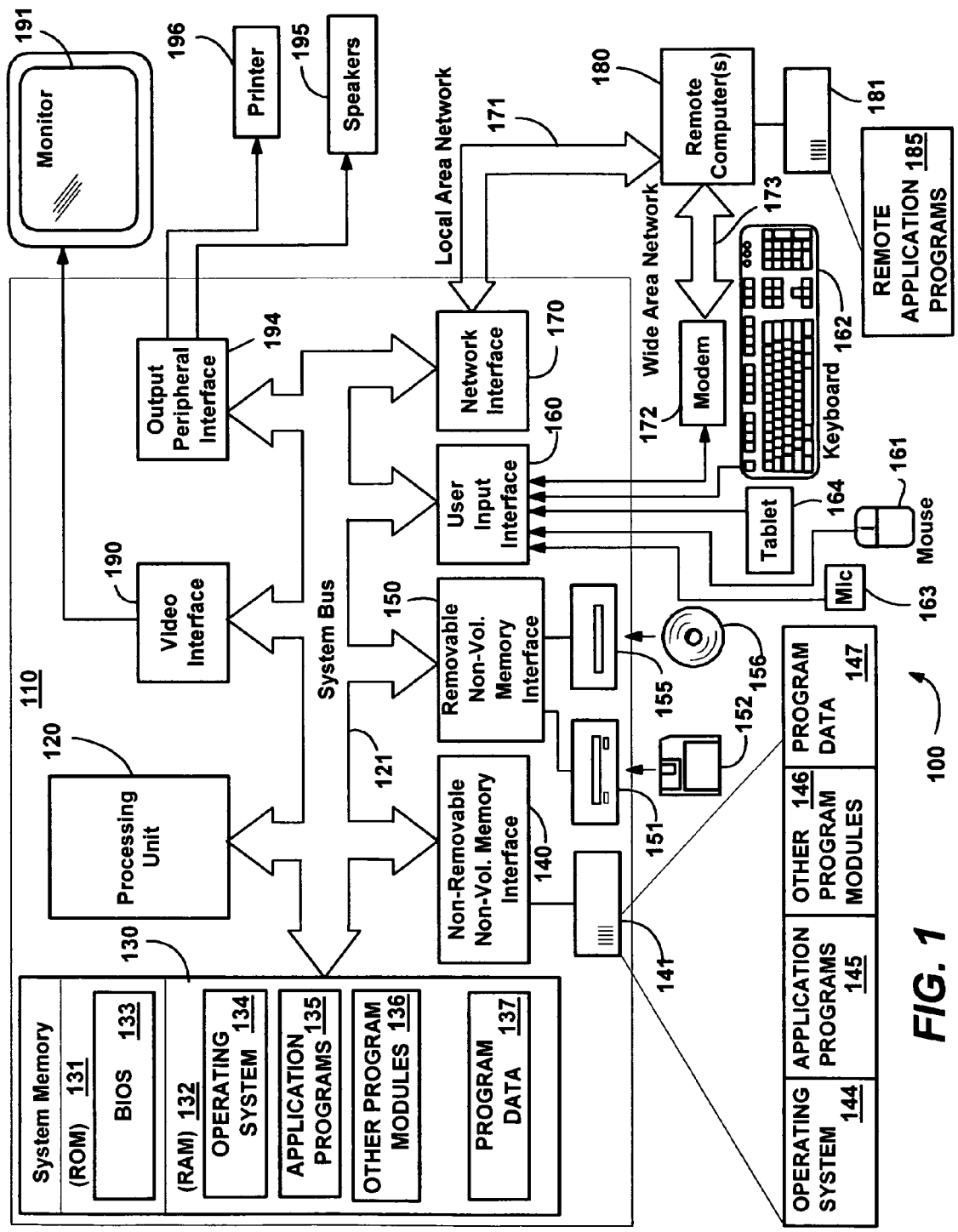
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Incarnation Numbers for Resource State Cycling

The present invention is generally directed towards a system and method by which the failure of cluster components such as nodes and resources does not cause later problems that result from delayed message processing. As will be understood, numerous ways to implement the present invention are feasible, and only some of the alternatives are described herein. For example, the present invention is described below with reference to an example in which a locker node provides a global lock to another node, and also to resource dependency trees in which dependent resources are restarted upon the failure of a resource on which they are dependent. Notwithstanding, other types of node and resource arrangements are feasible. As such, the present invention is not limited to any particular examples used herein, but rather may be used various ways that provide benefits and advantages in computing in general.

Figure 2A:
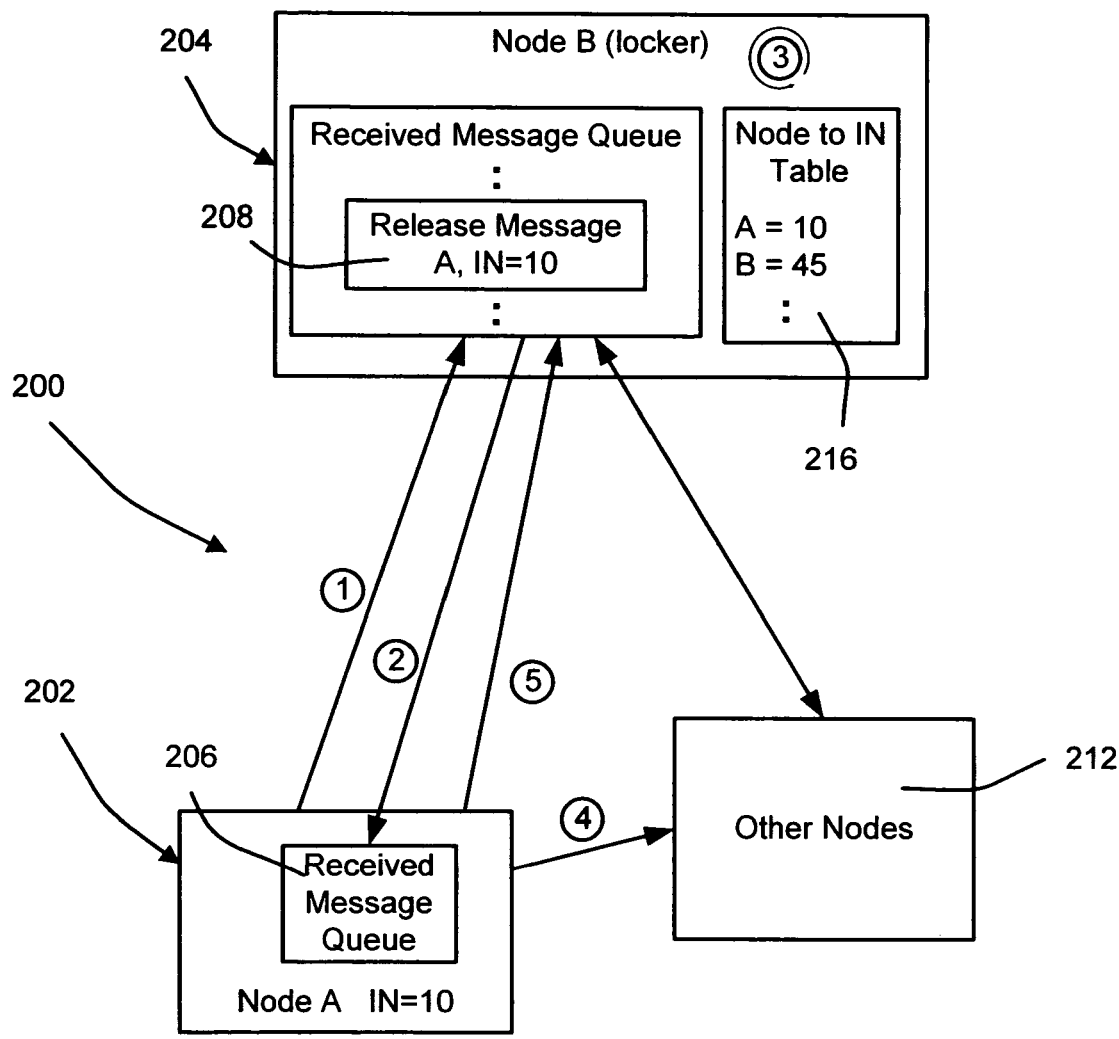
FIGS. 2A and 2B comprise block diagrams generally representing an example cluster over time, in which nodes communicate messages via message queues, with the messages associated with an incarnation number in accordance with various aspects of the present invention.

FIG. 2A shows an example of a cluster 200 of a node 202 (node A) and a node 204 (node B) communicating by passing messages via respective message queues 206 and 208. Other nodes may be in the cluster 200, as represented by the block 212. In the example of FIG. 2A, as represented by the arrows labeled with circled numerals, the node 202 wants to perform a global update, and to this end, has requested a lock from the node 204, which is a locker node in charge of a global lock. This is represented in FIG. 2A by the arrow labeled one (1).

More particularly, according to the GLUP protocol, one node serves as the locker node 204. The locker node ensures that only one global update is in progress at any given time. With GLUP, a node (e.g., the node 202) that wishes to send a global update to other nodes first sends a request to the locker node 204. When any preceding updates are complete, the locker node 204 gives permission for this "sender" node 202 to broadcast its update to the other nodes in the cluster 200. In accordance with GLUP, the sender node 202 sends the updates, one at a time, to the other nodes in a predetermined GLUP order that is ordinarily based on a unique number assigned to each node. GLUP can be utilized to replicate data to the machines of the cluster 200.

Thus, as represented in FIG. 2A by the arrow labeled two (2), the node 202 receives the lock when the node 204 processes its message queue 208 up to the point of that request. Note that after the lock is granted, the locker performs the update, as represented by the arrow labeled three (3). When the node 202 receives the lock, the node 202 goes around the cluster 200 asking the other nodes 212 (as well as instructing itself) to do the update, as represented in FIG. 2A by the arrow labeled four (4). The sender node 202 then releases the lock, as represented by (the arrow labeled five (5)).

Figure 2B:
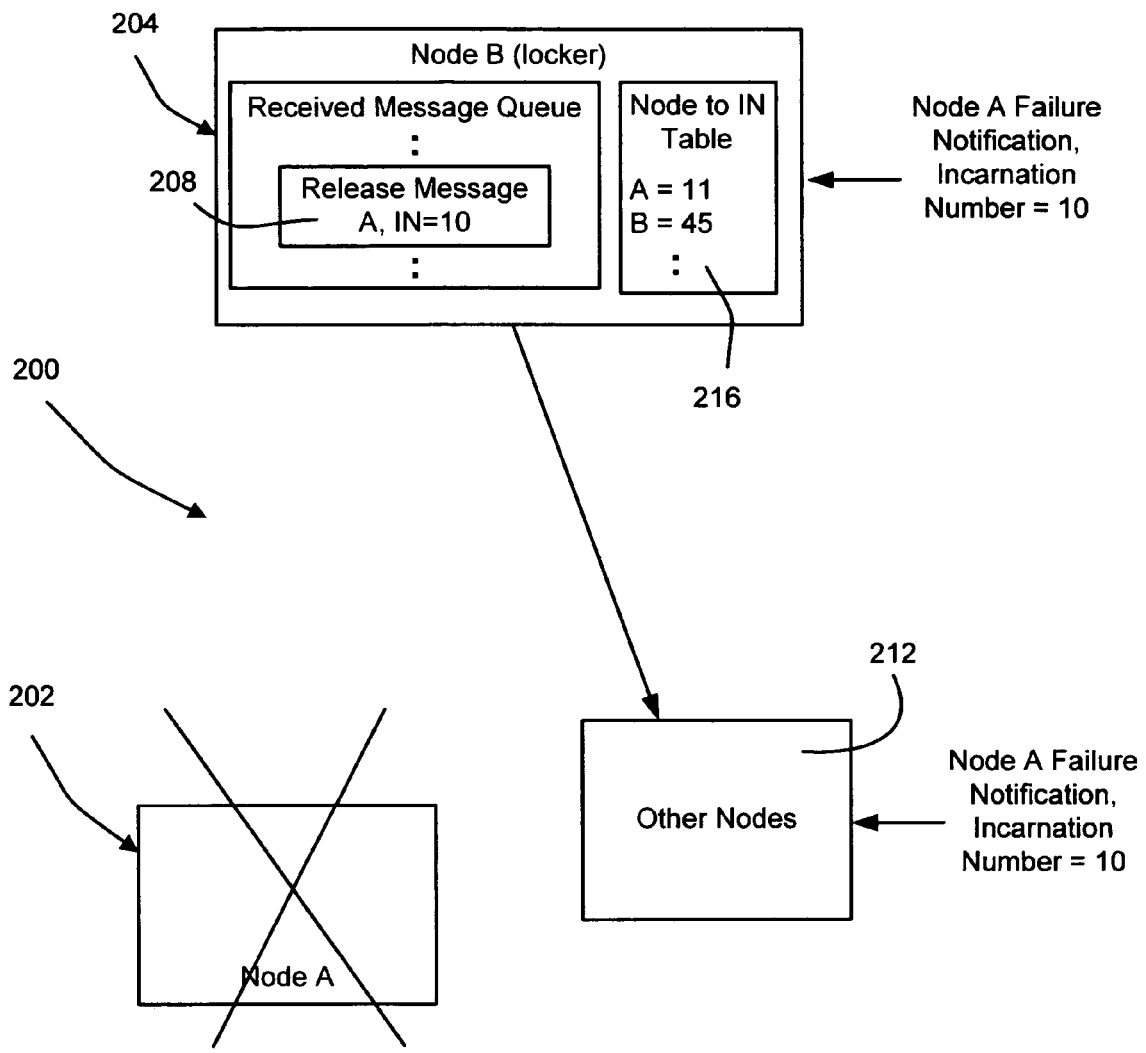

As represented in FIG. 2B by the crossed diagonal lines, the node 202 then dies, such as by crashing or because of a failure in its communication link to another node, or for some other reason. When this occurs the node 204 receives a failure notification, (as do the other nodes 212) such as via a node failure detection mechanism in the cluster. For example, a node is detected as failed when it fails to timely respond to regular pings. Note that such failure notifications need not be queued in the message queue 208, but may arrive in some other way; however even if queued, such a message may be queued before the lock release message if, for example, an intermediary node (not shown) exists that has not yet forwarded the release message from the node 202 to the locker node 204.

In any event, upon detecting the failure of the node 202, the node 204 frees the lock as part of a clean-up operation, because the cluster 200 cannot allow a lock to be held indefinitely by a failed node. Heretofore such a forced release, in combination with the later processing of the release message, caused problems in the cluster 200, essentially because the lock was released twice, once in response to the failure notification, and once when the released message was processed. Indeed, the lock could be released at a critical time because of processing the release message.

In accordance with various aspects of the present invention, to solve this and similar problems, incarnation numbers that correspond to various lives of the nodes (based on leaving and rejoining the cluster such as via failures and restarts) are used throughout the system to track the relevancy of each node's messages. Thus, in FIG. 2A, it is seen that the node 204, e.g., via a maintained node-to-incarnation-number (IN) table 216, knows that over the lifetime of the cluster 200, the node 202 currently has an incarnation number of ten, essentially meaning that the node 202 has previously left (e.g., has failed) and rejoined (e.g., has been restarted in) the cluster 200 ten times (if the first life started with an incarnation number of zero). Note that each node can maintain independent incarnation numbers, e.g., an incarnation number of ten (10) for node 202 on node 200 means that node 202 has left and joined the cluster ten times since the node 200 joined the cluster. For the same node 202, another node may maintain an independent incarnation number to denote the number of times a given node has joined the cluster since it joined the cluster.

When the failure notification is received, as represented in FIG. 2B, the failure notification for the node A 202 includes the current incarnation number of ten. The node B 204 increments this received number to eleven and stores the incremented number in the node-to-incarnation number (IN) table 216 for the node A 202. As can be readily appreciated, having the failure message include the associated incarnation number helps synchronize other nodes.

In accordance with various aspects of the present invention, at least some messages from nodes (e.g., significant ones related to global updates) include the incarnation number, whereby the maintained incarnation number corresponding to a node may be used to determine whether a queued message is relevant and needs to be acted upon, or is out-of-date and thus meaningless. As can be seen from the node-to-incarnation-number tables 216 of FIGS. 2A and 2B, any messages that are processed prior to the failure notification (while the node A 202 is alive) are relevant, because the message's incarnation number of ten matches the incarnation number for node A of ten in the node-to-incarnation-number table 216 of FIG. 2A. Conversely, in FIG. 2B, any messages that are processed after the failure notification are out-of-date, because the message's incarnation number of ten is less than the incarnation number for node A of eleven in the table 216. As described above, this is because the incarnation number for node A 202 was incremented in the incarnation number table 216 when the failure notification was received at the node 204.

Thus, in the present example, when the node 202 gets the lock, the response is stamped with the incarnation number of the requesting node 202 as the locker node 204 has it maintained, which is currently ten (10). When the lock is released, the release message contains the incarnation number of ten (10). The incarnation number is what enables the locker node 204 to throw away any stale release messages.

FIG. 3 represents the actions taken at the sender node 202, beginning at step 302 where the lock is requested, and received at step 304 including the incarnation number as maintained at the locker node 204. When received, step 306 represents the update request being sent to the other nodes. Step 308 represents the release lock message being prepared, including stamping it with the incarnation number that the locker node gave the sender node, which is then sent at step 310. Some time later, the sender node 202 fails, resulting in a failure notification being received at the locker node 204.

Figure 4:
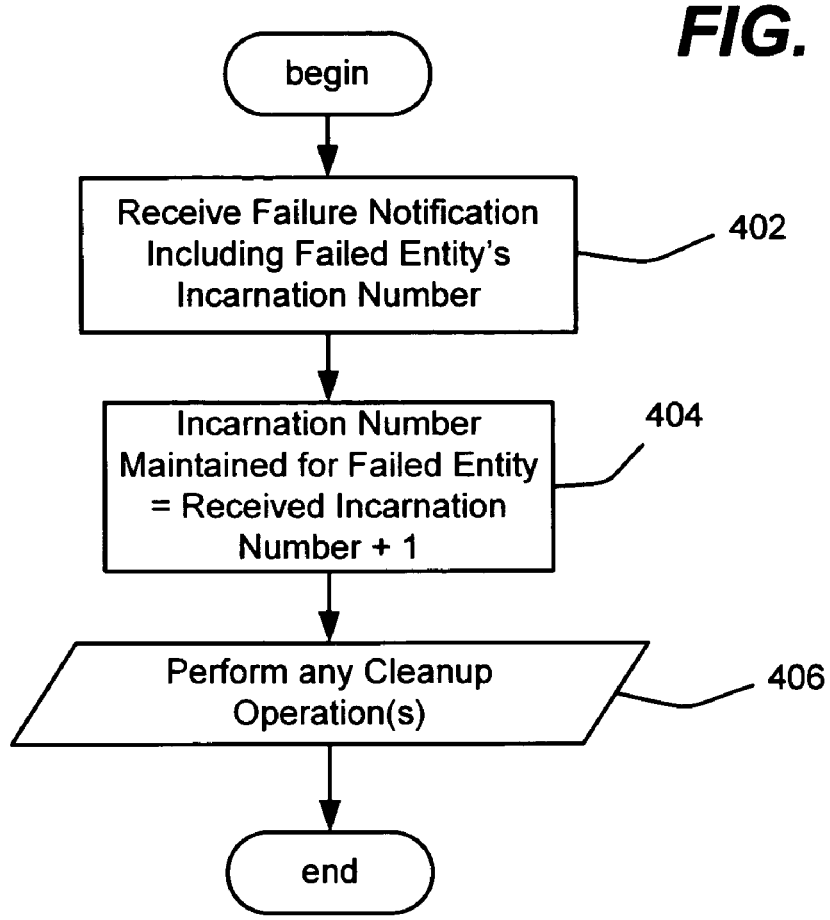

The failure notification handling process is generally represented in FIG. 4, wherein step 402 represents receiving the failure notification, e.g., at another node. The receiving node takes the incarnation number received with the failure message, increments it, and stores it, e.g., in the table 216 of FIG. 2B. Note that when dealing with incarnation numbers, incrementing is equivalent to decrementing from higher starting numbers and changing the comparison, adding or subtracting by something other than ones, and so forth. In any event, step 406 represents some clean-up action being taken in the cluster in response to the failure notification, such as freeing the lock in the above-described example.

Figure 5:
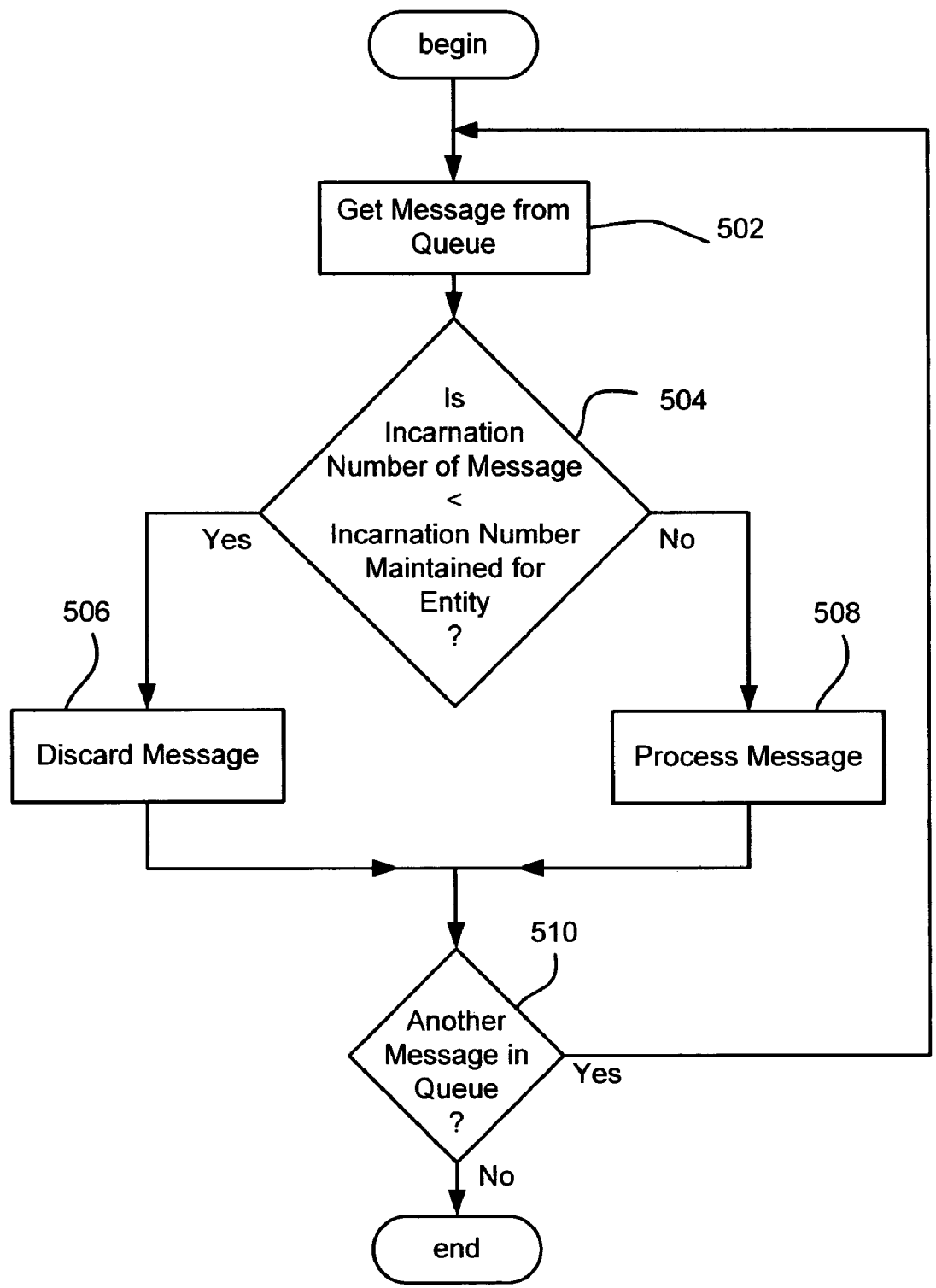
FIG. 5 is a block diagram generally representing the use of an incarnation number to determine whether to process a notification message, in accordance with various aspects of the present invention.

FIG. 5 represents message processing at a node, such as the locker node 204, based on the use of incarnation numbers in accordance with various aspects of the present invention. In FIG. 5, as each message is dequeued (step 502), its message incarnation number is evaluated against the message incarnation number maintained for the failed entity (e.g., the failed node). If the message's incarnation number is lower than the maintained one, then it is known that the message came from a node that has since failed. As such, clean-up has handled or will handle that node, and thus its prior message is meaningless, whereby it is discarded (step 506). Otherwise, the message corresponds to a node in its current incarnation, and thus the message is relevant, and is processed at step 508 because it is meaningful. Step 510 represents repeating to dequeue any further messages.

In this manner, relevant/current messages of existing nodes are distinguished from out of date messages of nodes that have failed, even if those nodes have come back online in a new incarnation prior to the message being processed. A similar concept applies to other cluster entities, including resources.

Cluster resources include cluster components such as application programs, their components, required hardware, IP addresses and so forth. A dependency between resources defines the order in which the resources are brought online or offline. For example, in the resource group of FIG. 6, (which runs on a node of the cluster such as the node 202 of FIG. 2A), a SQL resource SQL has a dependency on a disk resource D1 and a network name resource NN, forming a dependency tree 600. In this example, the disk resource D1 and the network name resource NN are referred to as provider resources, and the SQL resource is referred to as the dependent resource. The network name resource NN in turn has a dependency on an IP address resource. If the cluster attempts to bring the SQL resource online when the IP address and network name resources are offline and the disk resource is online, then cluster software comprising a resource control manager/failover manager software 602 would first attempt to bring the IP address resource online, next the network name resource and finally the SQL resource. Resource dependencies cannot span groups; that is, the dependent resource and the provider resource must belong to the same group.

A dependency, in general, also defines how the dependent resource is handled in the case of failure of the provider resource. More particularly, to handle the resource dependency tree 600 on a failure, when a provider resource fails, upon receiving the failure notification message at the resource control manager/failover manager 602, the cluster software traverses the dependency tree and brings the dependent resources to an offline state. In one implementation, when a resource fails, any resource that depends on the failed resource (directly or indirectly) is first terminated in order starting from the resource at the root of the chain to the failed resource. Thus, in the example of FIG. 6, if the IP address resource failed, then the SQL resource is terminated first (and its state changed to an offline state), followed by the network name resource NN (with its state changed to an offline state), followed by the IP address resource (with its state maintained as a failed state). After that, failure policies associated with the failed resource are applied.

In general, the termination of all dependent resources in the chain for every failure is time consuming and generally undesirable. Heretofore, however, unnecessary multiple terminations were possible because of the handling of multiple queued messages following other termination actions.

Figure 6:
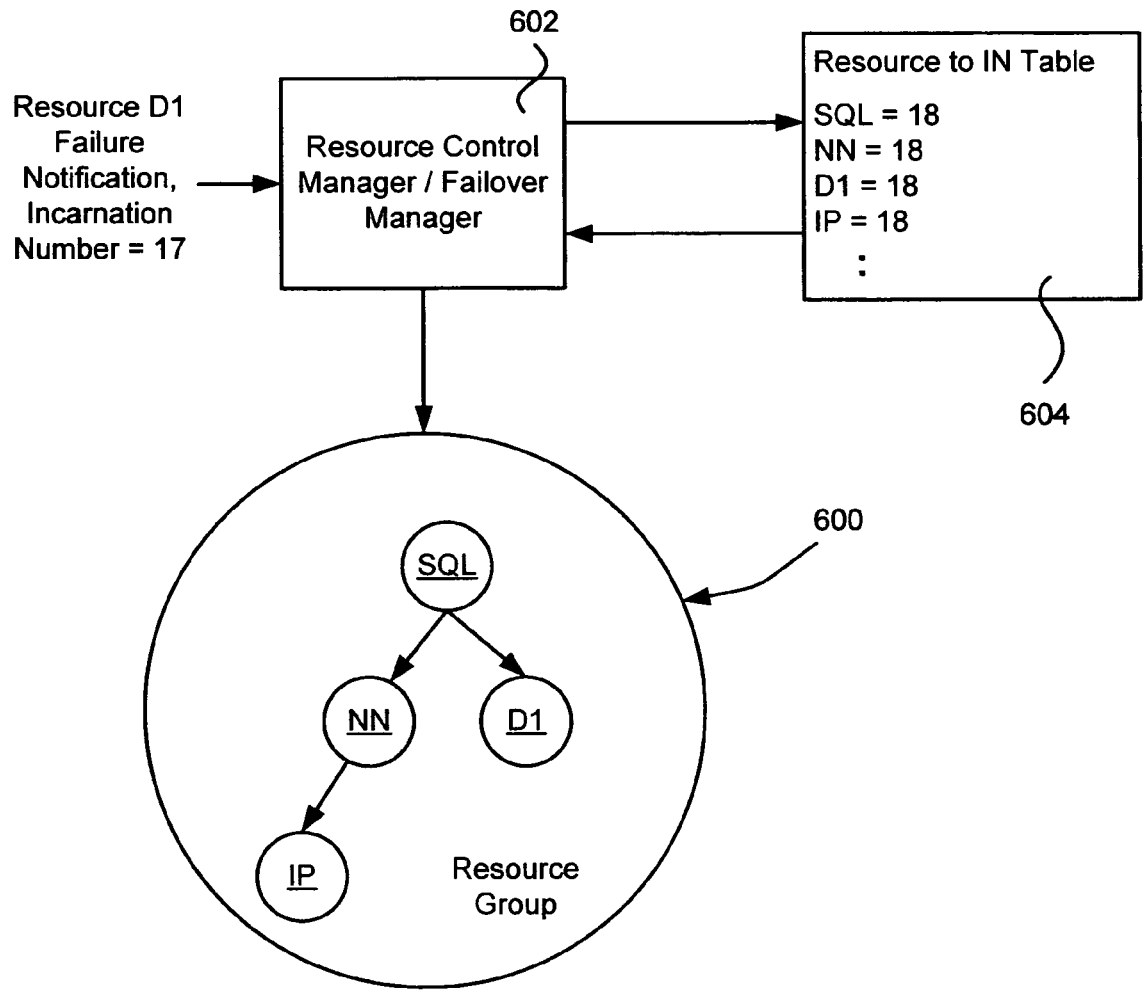
FIG. 6 is a block diagram generally representing an example cluster node with a resource dependency tree therein, in which an incarnation number is used to avoid redundant failure recovery actions, in accordance with various aspects of the present invention.

For example, in the dependency tree of FIG. 6, the SQL resource is dependent on the disk resource D1. When the tree 600 is brought online, the disk resource D1 is brought online first, and, after it has come online, the resource SQL is brought online. If the disk resource D1 fails, then a failure notification message is delivered to the resource control manager/failover manager 602, which in turn responds with a cleanup message. The necessary cleanup operations are typically performed, which may involve stopping the resource SQL. Once the resource SQL is stopped, the disk resource D1 is delivered the cleanup notification message, which could involve the stop of D1. After the cleanup is done, the resource D1 is restarted and then any dependent resources, including the resource SQL, are restarted.

As one example, consider a situation in which everything is online, and at some point D1 fails. Since D1 fails, it is very likely SQL fails, because disk access will fail. If the failover manager sees the D1 failure and not SQL's failure, the failover manager will restart the resource group in the appropriate order. However, at this time, the queued SQL failed message may occur, which heretofore caused another recovery action.

As another example, consider that the current state of D1 is online and SQL is in the process of coming online, that is, SQL is in an online pending state. At this time, if D1 fails and the resource control manager/failover manager 602 receives the failure notification message of D1, the resource control manager/failover manager 602 sends a cleanup notification message to SQL. It is possible that while this cleanup notification message is delivered to SQL, SQL can fail and the resource control manager/failover manager 602 can receive a failure notification message, and respond with another cleanup message to SQL. However, although a duplicate cleanup notification message has been delivered to SQL, the last failure notification message of SQL is out-of-date and should not be processed, because delivering a duplicate failure notification message to SQL triggers unnecessary recovery actions. In a complex dependency tree, such an action causes unnecessary recovery of various resources, thereby reducing resource availability.

In accordance with various aspects of the present invention, duplicate failure notification messages are not processed, and thus duplicate cleanup messages are not sent, by providing an incarnation number-based mechanism that correctly distinguishes that the last failure notification message of SQL is "stale" and should not be processed. To this end, each resource is associated with an incarnation number, and a resource-to-incarnation number table 604 maintained on the hosting node. Whenever a cleanup notification message is delivered to a resource, the resource's incarnation number is incremented (e.g., by one) in the table 604. The resource's incarnation number is passed on to the resource in every call the resource control manager/failover manager 602 makes into the resource. Thus, in the above example, when the online call was made into A for the very first time, an incarnation number of zero (0) is passed to the resource. The resource is expected to return back this value in a status message it sends back to the resource control manager/failover manager 602.

Figure 7:
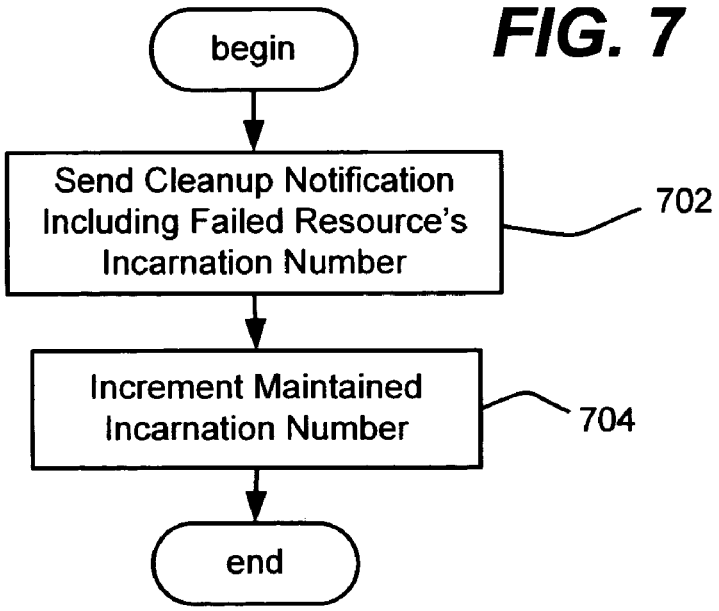
FIG. 7 is a flow diagram generally representing the handling of a resource failure notification message, in accordance with various aspects of the present invention.

When the first cleanup notification message is delivered to SQL, the incarnation number is incremented to one (1) by the resource control manager/failover manager 602 and passed on to SQL. FIG. 7 represents the sending of the cleanup message at step 702, and incrementing the maintained incarnation number at step 704.

In the meantime, if the resource control manager/failover manager 602 receives a failure notification message from the SQL resource, the failure notification message will have an incarnation number of zero (0). The resource control manager/failover manager 602 discards any failure notification message having an incarnation number less than the currently stored incarnation number, which in this example is currently one (1). In other words, in this example, the resource control manager/failover manager 602 will get a failure notification message with an incarnation number of zero (0), compare that with the current incarnation number of one (1), and since the failure notification message's associated incarnation number is less, that failure notification message will be discarded, and no additional cleanup message will be sent for this failure notification. Note that the steps of FIG. 5 similarly represent this determination as to whether to process the notification message as valid or discard it as outdated.

As can be seen from the foregoing detailed description, there is provided a method and system that provide a way for cluster software to distinguish between relevant/current notification messages that need to be acted upon and delayed notification messages that no longer have meaning.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
maintaining an incarnation number for a resource in a cluster, in which the resource is monitored for failure;
receiving notification of a failure of the resource;
determining from the incarnation number whether the failure notification message corresponds to a current incarnation of the resource, and if not, discarding the failure notification message, and if so, processing the failure notification message, including associating the incarnation number with a cleanup message and sending the cleanup message with the associated incarnation number.

2. The method of claim 1 wherein maintaining an incarnation number for a resource in a cluster comprises maintaining a table that corresponds incarnation numbers to monitored resources.

3. The method of claim 1 further comprising, incrementing the incarnation number that is maintained in conjunction with sending the cleanup message.

4. One or more computer-readable storage media having stored computer-executable instructions which when executed perform the method of claim 1.

5. In a computing environment, a system comprising:
at least one resource operating in a cluster node that is monitored for failure;
a mechanism that maintains an incarnation number for the resource, and receives a failure notification message when the resource fails, the mechanism further configured to determine from the incarnation number whether the failure notification message corresponds to a current incarnation of the resource, and to only send a cleanup message if the failure notification message was not from a previous incarnation of the resource.

6. The system of claim 5 wherein the mechanism determines that the failure notification was from a previous incarnation of the resource and discards the failure notification message.

7. The system of claim 5 wherein the mechanism determines that the failure notification was from a current incarnation of the resource and sends a cleanup message.

8. The system of claim 7 wherein the mechanism increments that incarnation number that is maintained in conjunction with sending the cleanup message.

9. The system of claim 5 wherein the resource is in a dependency tree of resources.

10. The system of claim 9 wherein the resource is dependent on at least one other resource.

11. The system of claim 9 wherein at least one other resource is dependent on the resource.

12. The system of claim 9 wherein the resource corresponds to an application program.

13. The system of claim 9 wherein the resource comprises hardware used by an application program.

14. The system of claim 9 wherein the resource comprises a network-related resource used by an application program.

15. The system of claim 5 wherein the mechanism maintains a table that contains an incarnation number for the resource.

16. At least one computer-readable storage medium having stored computer-executable instructions, which when executed perform a method comprising:
receiving a message corresponding to a cluster resource, the message including a received incarnation number, wherein the received message corresponds to a failure notification for a cluster resource;
for the received message, comparing the received incarnation number with a current incarnation number, and
a) if the received incarnation number does not match the current incarnation number, taking a first action with respect to the message, wherein the taking the first action comprises discarding the message; and
b) if the received incarnation number matches the current incarnation number, taking a second action with respect to the message that is different from the first action, and wherein the second action comprises sending a cleanup notification.

17. The computer-readable medium of claim 16 further comprising, restarting the cluster resource.

18. The computer-readable medium of claim 17 wherein the cluster resource is dependent on another resource, and further comprising, restarting the other cluster resource.

19. The computer-readable medium of claim 16, wherein taking the second action further comprises incrementing the current incarnation number.

* * * * *